United States Patent
Smith et al.

[11] Patent Number: 5,964,472
[45] Date of Patent: Oct. 12, 1999

[54] INDEPENDENT PEDALING SYSTEM FOR TANDEM BICYCLES

[75] Inventors: Joel N. Smith, Edmonds; Grant Bower, Seattle, both of Wash.; Terry McIlraith, Lag Taguette, Calif.

[73] Assignee: Advanced Transportation Products, Inc., Seattle, Wash.

[21] Appl. No.: 08/801,790

[22] Filed: Feb. 14, 1997

[51] Int. Cl.⁶ ..................................................... B62M 1/02
[52] U.S. Cl. .......................... 280/231; 280/259; 280/261
[58] Field of Search .................................... 280/259, 261, 280/231, 260, 288.1

[56] References Cited

U.S. PATENT DOCUMENTS

| | | |
|---|---|---|
| 391,490 | 10/1888 | Smith . |
| 2,181,665 | 11/1939 | Messamore .............................. 280/259 |
| 3,191,965 | 6/1965 | Wilkens .................................. 280/231 |
| 4,029,326 | 6/1977 | Blow, Jr. ................................. 280/231 |
| 4,108,460 | 8/1978 | Silva, Jr. . |
| 4,502,705 | 3/1985 | Weaver . |
| 4,936,597 | 6/1990 | Hartmann ................................ 280/261 |
| 5,209,507 | 5/1993 | Domenge . |
| 5,375,865 | 12/1994 | Terry, Sr. . |
| 5,426,997 | 6/1995 | Brion .................................... 74/594.1 |
| 5,590,894 | 1/1997 | Wen . |
| 5,590,895 | 1/1997 | Hiramoto . |

OTHER PUBLICATIONS

Article; "Bicycle: Back–Pedalling Brake and Firewheel"; volume unknown; pp. 460–465; date unknown.
Article; "Bicycle"; volume unknown; pp. 280–284; date unknown.

*Primary Examiner*—Daniel G. DePumpo
*Attorney, Agent, or Firm*—Christensen, O'Connor, Johnson & Kindness PLLC

[57] ABSTRACT

A drive system for a tandem bicycle (10) to allow a captain or a stoker to pedal independently of one another. A unidirectional bearing, e.g., a freewheel assembly (24) is incorporated in a captain crank assembly (20), a stoker crank assembly (100), or both assemblies. In the preferred embodiment of the captain crank assembly, a first adapter plate (36) and a second adapter plate (38) attach the freewheel assembly to a chainring (34). In the preferred embodiment of the stoker crank assembly, a first adapter plate (102) and a second adapter plate (104) attach the freewheel assembly to four chainrings (114, 128, 130, 134). The captain crank assembly is coupled to the stoker crank assembly by a single chain (12), and the stoker crank assembly is coupled to a rear hub (18) of the bicycle by a single chain (14). When the freewheel assembly is incorporated in both the captain crank assembly and the stoker crank assembly, either rider may stop pedaling while the other rider continues to pedal forward.

13 Claims, 7 Drawing Sheets

INDEPENDENT PEDALING SYSTEM FOR TANDEM BICYCLES

FIELD OF THE INVENTION

The present invention relates generally to systems for generating motion of a tandem bicycle and, more particularly, to a pedaling system for a tandem bicycle.

BACKGROUND OF THE INVENTION

Conventional tandem bicycles include drive systems that provide a direct linkage between the pedals of the front rider, or captain, and the rear rider, or stoker. The direct linkage results in a pedaling system in which both the captain and stoker must start and stop pedaling at the same time, and generally pedal at the same cadence. The captain and stoker must also start at the same place of a stroke. A directly linked pedaling system can be quite difficult to master for an inexperienced cycling pair or a cycling pair with different physical capabilities. The cycling pair must be able to effectively communicate to execute pedaling functions, such as coming to a stop or adjusting toe straps. Moreover, the cycling pair must always maintain the same cadence while pedaling. Because the pedals are linked, one rider cannot rest while the other rider maintains the speed of the bike. As a result, a captain and stoker having different levels of fitness often find that they are unable to ride at a rate where both riders are comfortable.

Bicycle manufacturers have recognized that it would be advantageous to allow a rider on a tandem bicycle to pedal independently of a partner, and have attempted to design drive systems that would accomplish such a goal. One proposed system to allow a tandem rider to stop pedaling while the other continues pedaling is a jack-shaft system, such as the system disclosed in U.S. Pat. No. 4,502,705 to Weaver. As shown in Weaver, the jack-shaft system adds an intermediate hub that is linked to a front crank assembly by a first chain, and to a rear crank assembly by a second chain. The rear crank assembly is coupled to a freewheel rear hub by a third chain. The use of the intermediate hub allows the rear crank assembly to rotate while the front crank assembly is not rotating.

While the jack-shaft system suggested in Weaver is an improvement over conventional drive systems in tandem bicycles, the jack-shaft system still retains several shortcomings. For example, the jack-shaft system adds a third shaft and chain to the tandem bicycle which increases the weight of the bicycle. The increase in weight makes the bicycle more difficult to pedal and less maneuverable during operation. The jack-shaft system is quite complex, and, as any rider knows, the more complex the system, the greater the chance that a malfunction will occur. The cost of a jack-shaft system is also significantly more than that of a conventional drive system, since an additional shaft, chain, and chainrings must be added to the tandem bicycle.

Another disadvantage of the jack-shaft system disclosed in Weaver is that the tandem bicycle frame must be constructed to accept the jack-shaft. Jack-shaft systems therefore cannot be easily retrofitted onto existing tandem bicycles.

An even greater shortcoming of the jack-shaft system, however, is that the jack-shaft only partially solves the problem of directly linked pedaling by the stoker or the captain. In the system disclosed in Weaver, the captain cannot stop pedaling unless the stoker stops pedaling. Consequently, only the stoker may rest during the pedaling process. If the captain stops pedaling, the stoker must also stop pedaling.

The present invention is directed to overcoming the foregoing and other disadvantages. More specifically, the present invention is directed to providing a system that allows independent pedaling by the captain and stoker on a tandem bicycle.

SUMMARY OF THE INVENTION

In accordance with this invention, a drive system that allows independent pedaling of a tandem bicycle is provided (hereinafter the "independent pedaling system"). The tandem bicycle includes a first and second pedaling station in which are seated a captain and a stoker. The independent pedaling system allows independent pedaling by the captain, the stoker, or both the captain and the stoker. In the latter system, the stoker may stop pedaling while the captain continues pedaling in a forward direction, or the captain may stop pedaling while the stoker continues pedaling in a forward direction. As in conventional systems, the stoker and captain may also simultaneously stop pedaling.

The independent pedaling system may be incorporated in a captain crank assembly, a stoker crank assembly, or both assemblies. A crank assembly that allows independent pedaling is constructed around a unidirectional bearing, e.g., a freewheel assembly. The freewheel assembly is secured between a first adapter plate and a second adapter plate. Chainrings are coupled to the first and second adapter plates. A crank arm is attached to the freewheel assembly, and the freewheel assembly fixed to an axle of a conventional bottom bracket on the tandem bicycle. A second crank arm is attached to the axle on the opposite side of the bottom bracket.

The freewheel assembly allows pedaling in only one direction. That is, pedaling or turning the crank arms in one rotary direction causes the freewheel assembly to engage and turn an attached chainring. Pedaling or turning the crank arms in the opposite rotary direction does not engage the freewheel assembly and turn the chainring. If the chainring is maintaining a constant rotary velocity, the crank arms must be turned at a rotary velocity equal to the constant rotary velocity of the chainring in order for the freewheel assembly to engage and provide power to the chainring.

In accordance with one aspect of the invention, the captain crank assembly is linked to the stoker crank assembly by a single chain. The stoker crank assembly is linked to the rear hub of the bicycle by a second chain. Only two chains are therefore required to implement a system allowing the captain and stoker to pedal independently on a tandem bicycle. The two chains are preferably located on the same side of the tandem bicycle frame, further simplifying the construction of the system.

In accordance with yet another aspect of the invention, the independent pedaling system may be easily retrofitted onto existing tandem bicycles to allow a stoker and a captain to pedal independently. The independent pedaling system simply replaces the existing chainring and crank arm assembly on the bike. The independent pedaling system may therefore be used with an existing and conventional derailleur system. The independent pedaling system also does not require any structural changes to the frame of a conventional tandem bicycle.

In accordance with still another aspect of the invention, the number and type of chainrings that may be fixed to the first and second adapter plates may be varied. By varying the size of the chainrings in the system, the captain and the stoker may select a desired gearing that allows the captain and stoker to pedal at different cadences.

As will be readily appreciated from the foregoing summary, the independent pedaling system provides several advantages over the jack-shaft system disclosed in the prior art. Because the independent pedaling system of the present invention does not require an extra shaft and chain, the system is lighter, costs less, and is generally less complex to maintain and repair. Moreover, because the system does not require a third axle, the system may be easily retrofitted into conventional tandem bicycles. The disclosed independent pedaling system therefore improves the overall experience of riding a tandem bicycle.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
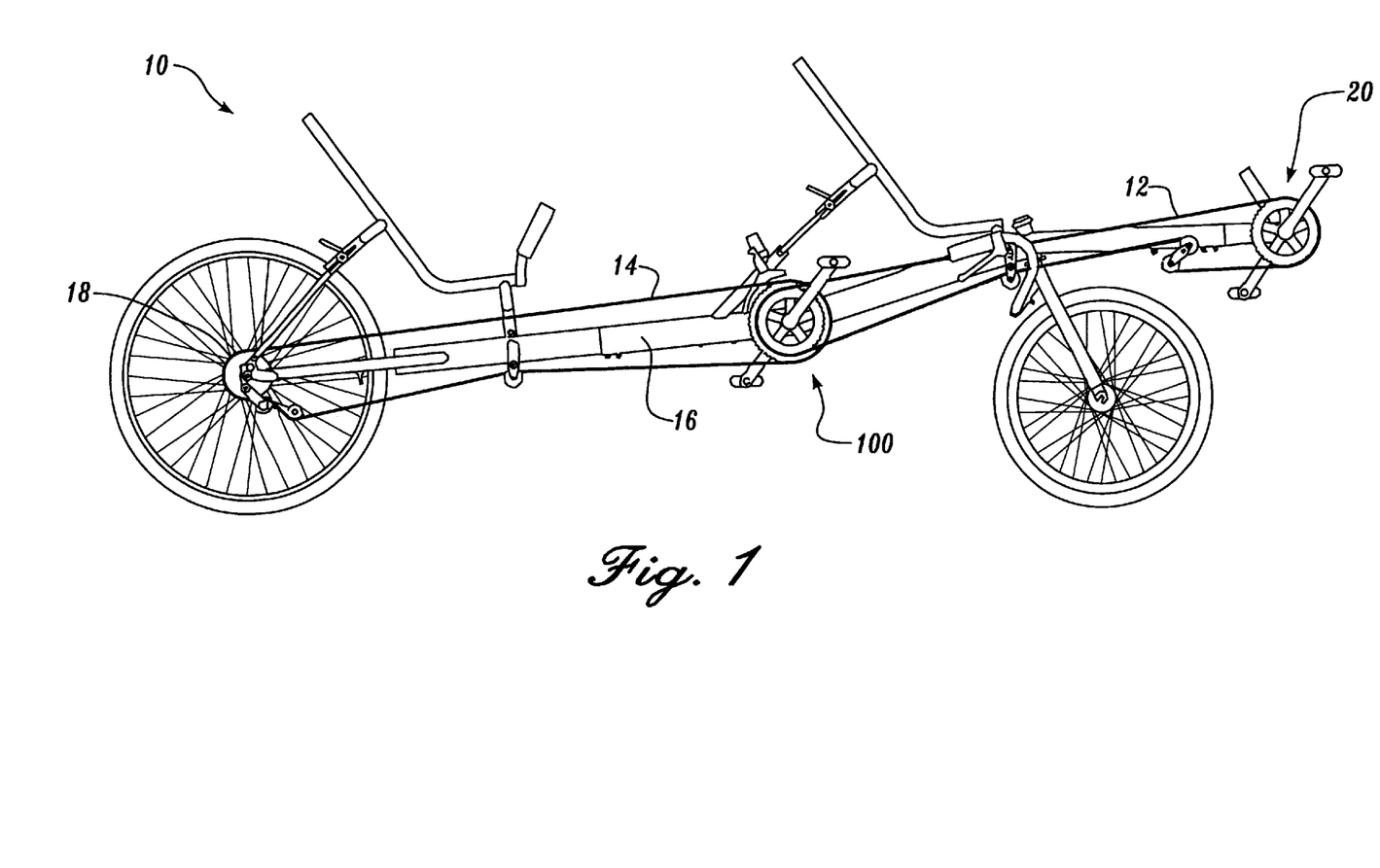
FIG. 1 is a side view of a recumbent tandem bicycle with an independent pedaling system of the present invention including a captain crank assembly and a stoker crank assembly.
Figure 2:
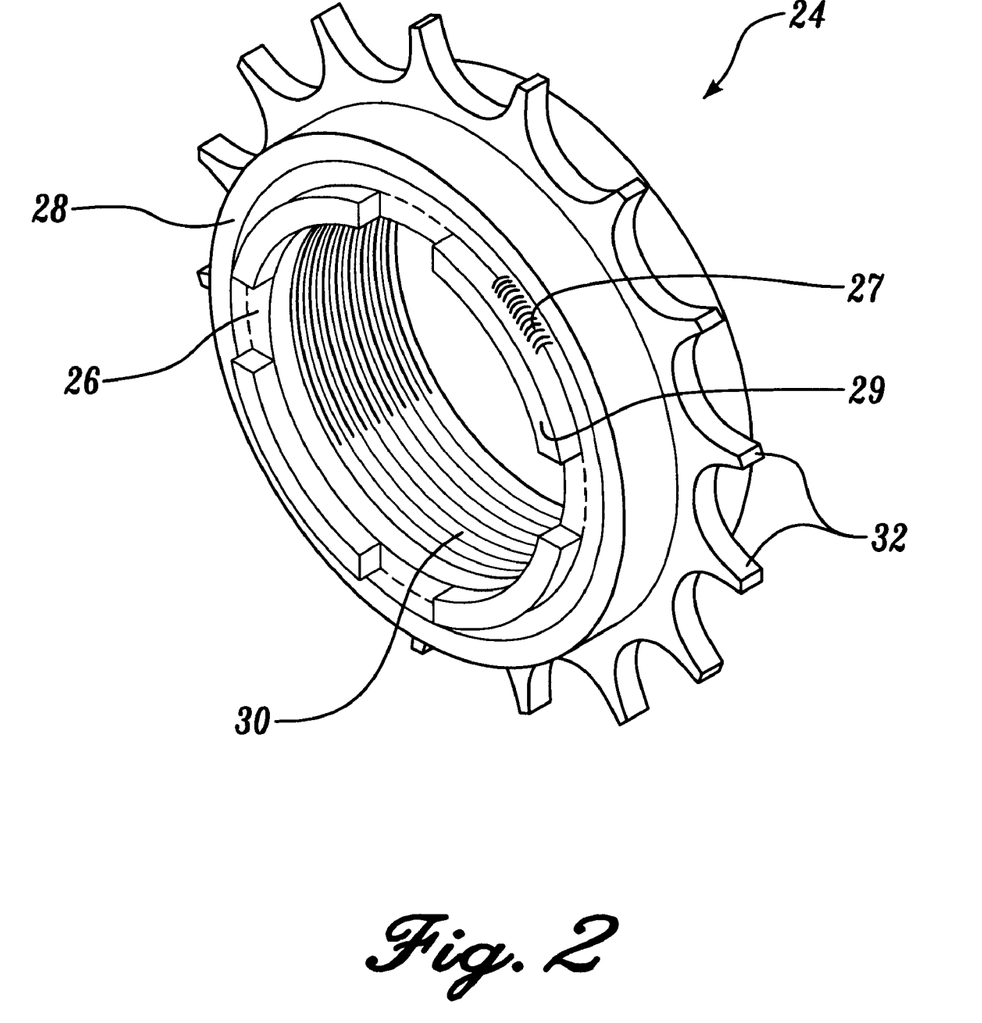
FIG. 2 is a perspective view of a freewheel assembly that is incorporated in the independent pedaling system.

The independent pedaling system of the present invention is comprised of a crank assembly that allows either a stoker or a captain of a tandem bicycle to stop pedaling while the other continues pedaling in a forward direction. FIG. 1 depicts a recumbent tandem bicycle 10 that incorporates the independent pedaling system. The captain, or rider at the front of the tandem bicycle, pedals a captain crank assembly 20. The stoker, or rider in the rear of the tandem bicycle, pedals a stoker crank assembly 100. The captain crank assembly 20 is coupled to the stoker crank assembly 100 by a single continuous chain 12. The stoker crank assembly 100 is coupled to a rear hub 18 of the tandem bicycle by a single continuous chain 14. Preferably, both chains 12 and 14 are located on the same side of the tandem bicycle frame 16. As will be described in additional detail below, the captain crank assembly 20, the stoker crank assembly 100, or both crank assemblies may incorporate a unidirectional bearing, e.g., a freewheel assembly. The freewheel assembly allows the rider with the freewheel assembly to stop pedaling while the other rider continues pedaling in a forward direction. The independent pedaling system of the present invention therefore allows two riders of different fitness levels to ride comfortably together.

Figure 3:
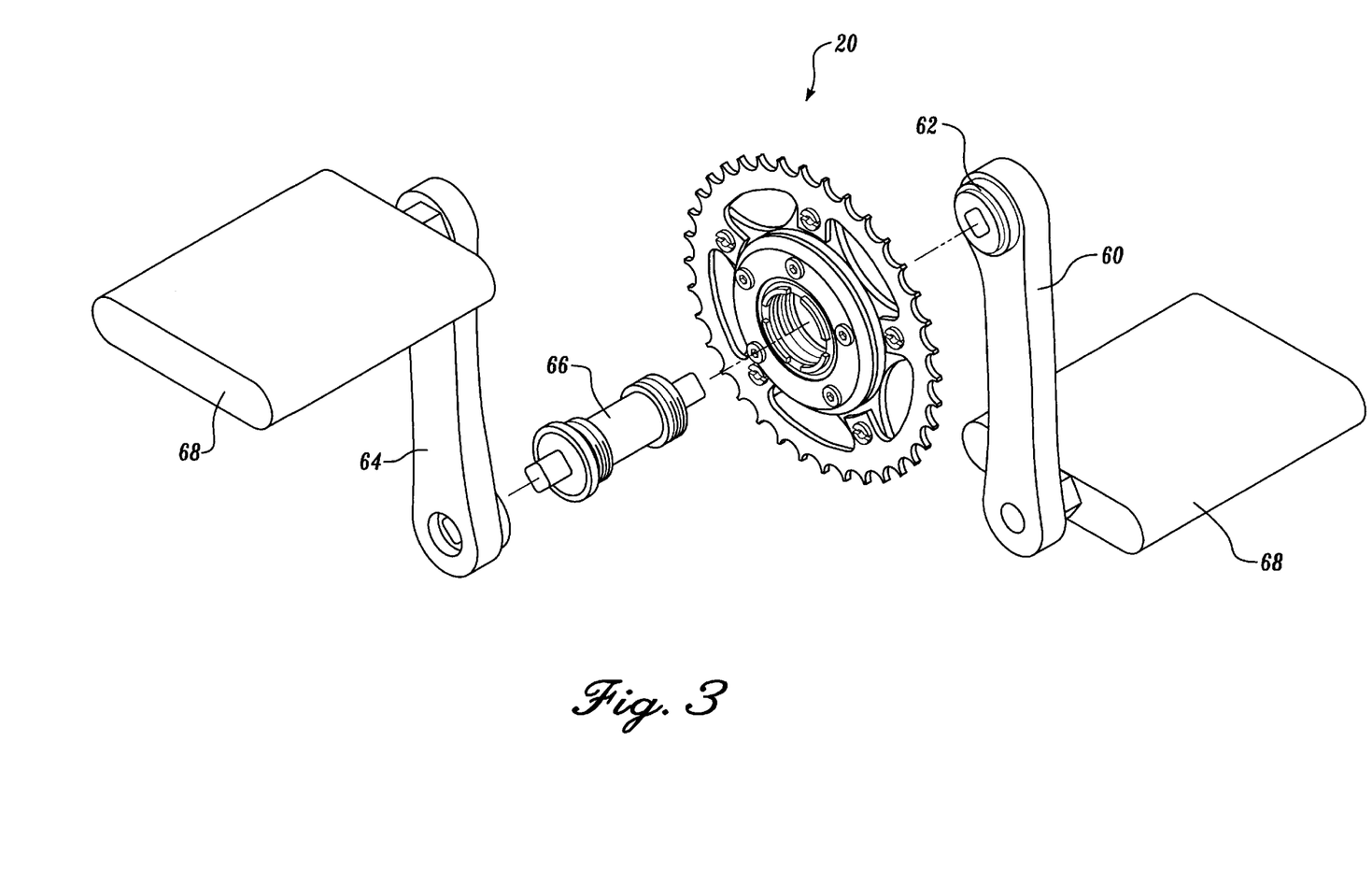
FIG. 3 is a perspective view of the captain crank assembly according to the present invention.

To allow independent pedaling, the captain crank assembly 20, the stoker crank assembly 100, or both assemblies are preferably constructed around a freewheel assembly. FIG. 3 depicts a representative freewheel assembly 24 that may be incorporated in either crank assembly. The freewheel assembly 24 is a sealed unit that is typically incorporated on the rear hub of a bicycle. The freewheel assembly is generally cylindrical, having an inner sleeve 26 that fits inside of, and rotates with respect to, an outer sleeve 28. The inner sleeve 26 has an interior surface 30 that is threaded to receive a crank arm. The outer sleeve is formed with a chainring 32 around the outside of the assembly. A suitable freewheel assembly for use in the independent pedaling system of the present invention is manufactured by Shimano, and sold as a 16-tooth BMX freewheel, Part No. SF-MX30. It has been found that the only modification required to use the Shimano freewheel is that an additional weld 27 must be added to the freewheel assembly adjacent one of four members 29 that protrude from the inner sleeve 26. The weld strengthens the inner sleeve (which is composed of two parts as indicated by the dashed lines) to withstand the additional forces generated when incorporated in a tandem bicycle.

The freewheel assembly 24 includes a unidirectional bearing. Pedaling or turning a crank arm attached to the inner sleeve 26 of the freewheel assembly in one rotary direction causes the bearing to engage and turn the outer sleeve 28 of the freewheel in the same direction as the inner sleeve. Turning the crank arm in the opposite rotary direction causes the inner sleeve 26 to rotate independent of the outer sleeve 28. If the outer sleeve 28 is maintaining a constant rotary velocity, the inner sleeve 26 must be accelerated to a rotary velocity equal to the rotary velocity of the outer sleeve 28 before the outer sleeve is engaged and driven synchronously with the inner sleeve.

Figure 4:
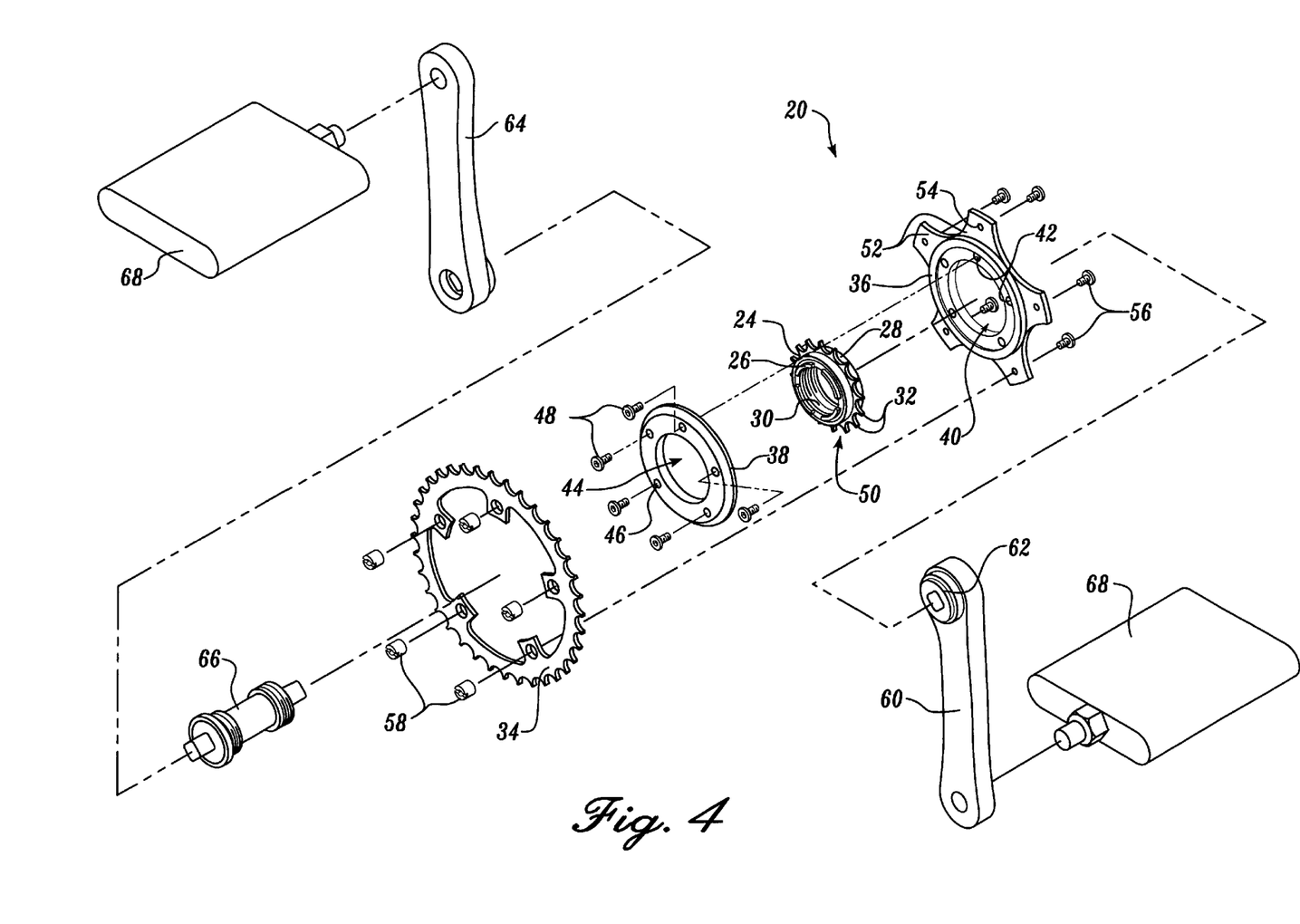
FIG. 4 is an exploded view of the captain crank assembly of FIG. 3.

FIGS. 3 and 4 illustrate the construction of the captain crank assembly 20 to allow independent pedaling by the captain. A chainring 34 is attached to the freewheel assembly 24 using a first adapter plate 36 and a second adapter plate 38. The first adapter plate 36 is ring-shaped, with an inner hole 40 that is sized slightly larger than the diameter of the outer sleeve 28 of the freewheel assembly 24. The first adapter plate 36 has a plurality of threaded holes 42, preferably five, spaced at equidistant points around the circumference of the plate. The second adapter plate 38 is also ring-shaped, with an inner hole 44 that is sized slightly larger than the diameter of the outer sleeve 28 of the freewheel assembly 24. A plurality of holes 46, preferably five, are similarly spaced at equidistant points around the circumference of the second adapter plate.

The freewheel assembly 24 is secured between the first and second adapter plates 36 and 38 by a plurality of hex bolts 48. Each hex bolt 48 is inserted through a hole 46 in the second adapter plate 38, through a notch 50 formed by adjacent teeth on the chainring 32 of the freewheel assembly 24, and into a corresponding threaded hole 42 in the first adapter plate 36. During assembly, the freewheel assembly 24 must therefore be oriented so that the teeth on the chainring 32 do not coincide with the location of the mounting holes 42 and 46. The five hex bolts 48 secure the first adapter plate 36 to the second adapter plate 38, and maintain the freewheel assembly 24 locked between the two plates. Because the shaft of each hex bolt 48 is located in a notch 50 between adjacent teeth on the chainring 32 of the freewheel assembly, the position of the chainring 32 is fixed with respect to the first and second adapter plates. In this configuration, the first and second adapter plates are therefore fixed relative to the outer sleeve 28 of the freewheel assembly 24, and free to rotate around the inner sleeve 26 of the assembly. When correctly assembled, the exterior of the freewheel assembly 24 is preferably flush with the exterior surface of the first adapter plate 36.

A chainring 34 of a desired size is attached to the first adapter plate 36. The first adapter plate 36 has five arms 52 that are equally spaced around the exterior circumference of the adapter plate and extend radially from the body of the adapter plate. Each arm 52 is formed with a hole 54 that is located and sized so that the five holes in the arms of the adapter plate correspond with the location of mounting holes provided on a conventional chainring. A bolt 56 is placed through each arm 52 of the first adapter plate 36, through the corresponding mounting holes in the chainring 34, and secured by a threaded insert 58, fixing the chainring to the first adapter plate. The assembled adapter plates and chainring is depicted in FIG. 3.

A first crank arm 60 is secured to the freewheel assembly 24 by screwing a threaded plug 62 on the crank arm into the freewheel assembly. The first crank arm 60 and freewheel assembly and a second crank arm 64 are then attached to an axle protruding from either side of a conventional bottom bracket 66. Those skilled in the art will recognize that the bottom bracket 66 is mounted in the frame 12 of the bicycle. Pedals 68 are then fastened to both crank arms to complete the captain crank assembly 20.

Incorporating the freewheel assembly in the captain crank assembly 20 allows the captain to stop pedaling at any time during operation of the tandem bike. When the captain stops pedaling and the stoker continues pedaling in a forward direction, the stoker continues to drive both chains 12 and 14. The motion of chain 14 continues to drive the tandem bicycle. The motion of chain 12 causes the outer sleeve 28 of the freewheel assembly 24 to rotate around the inner sleeve 26. The captain's crank arms remain stationary, however, due to the action of the freewheel assembly. When the captain resumes pedaling in a forward direction and brings the inner sleeve 26 of the freewheel assembly to the same rotary velocity as the outer sleeve 28 of the freewheel assembly, the unidirectional bearing is engaged and the pedaling force of the captain is added to that of the stoker. The captain may therefore alternate between resting and forward pedaling as desired.

Figure 5:
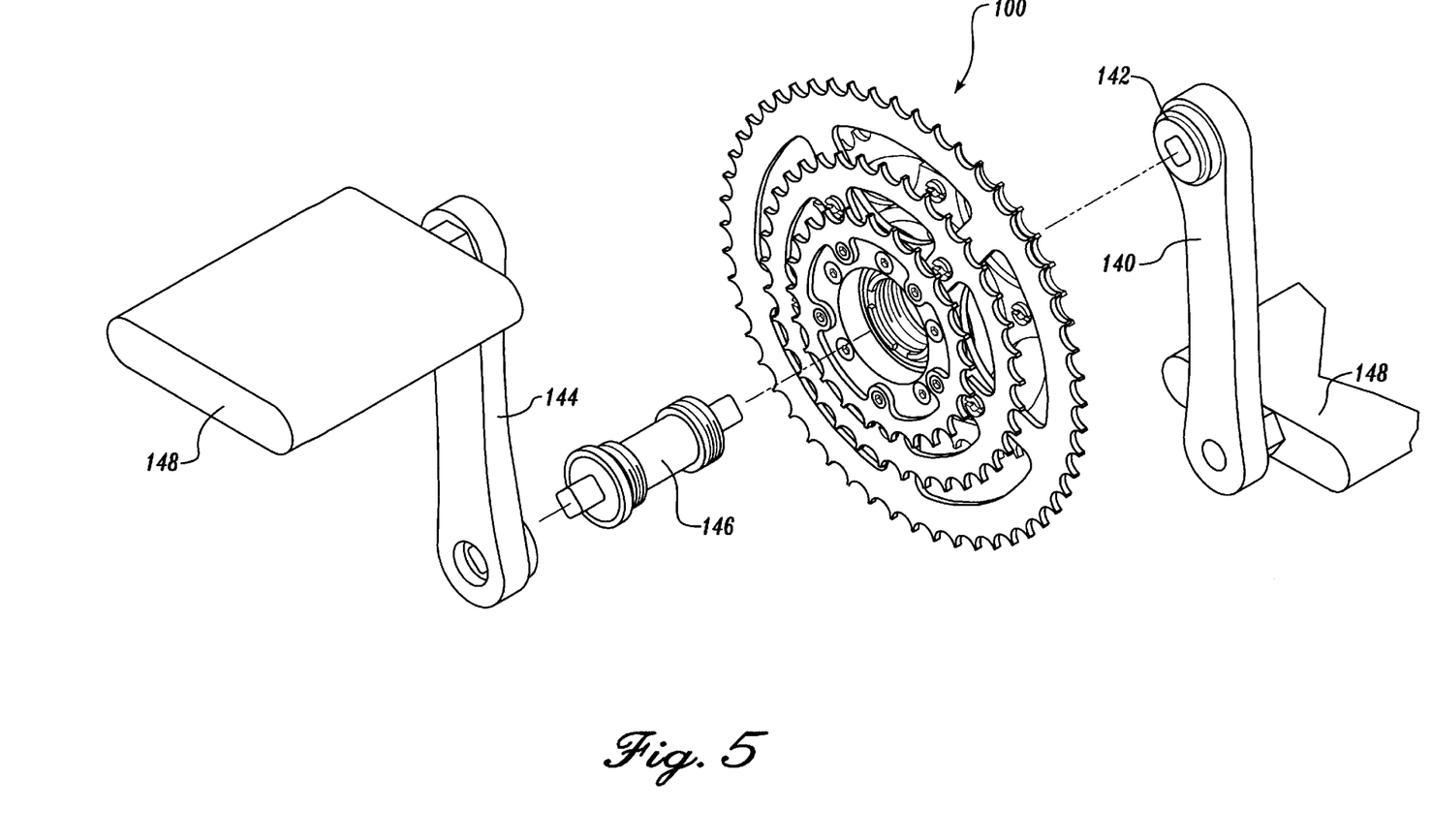
FIG. 5 is a perspective view of the stoker crank assembly according to the present invention.
Figure 6:
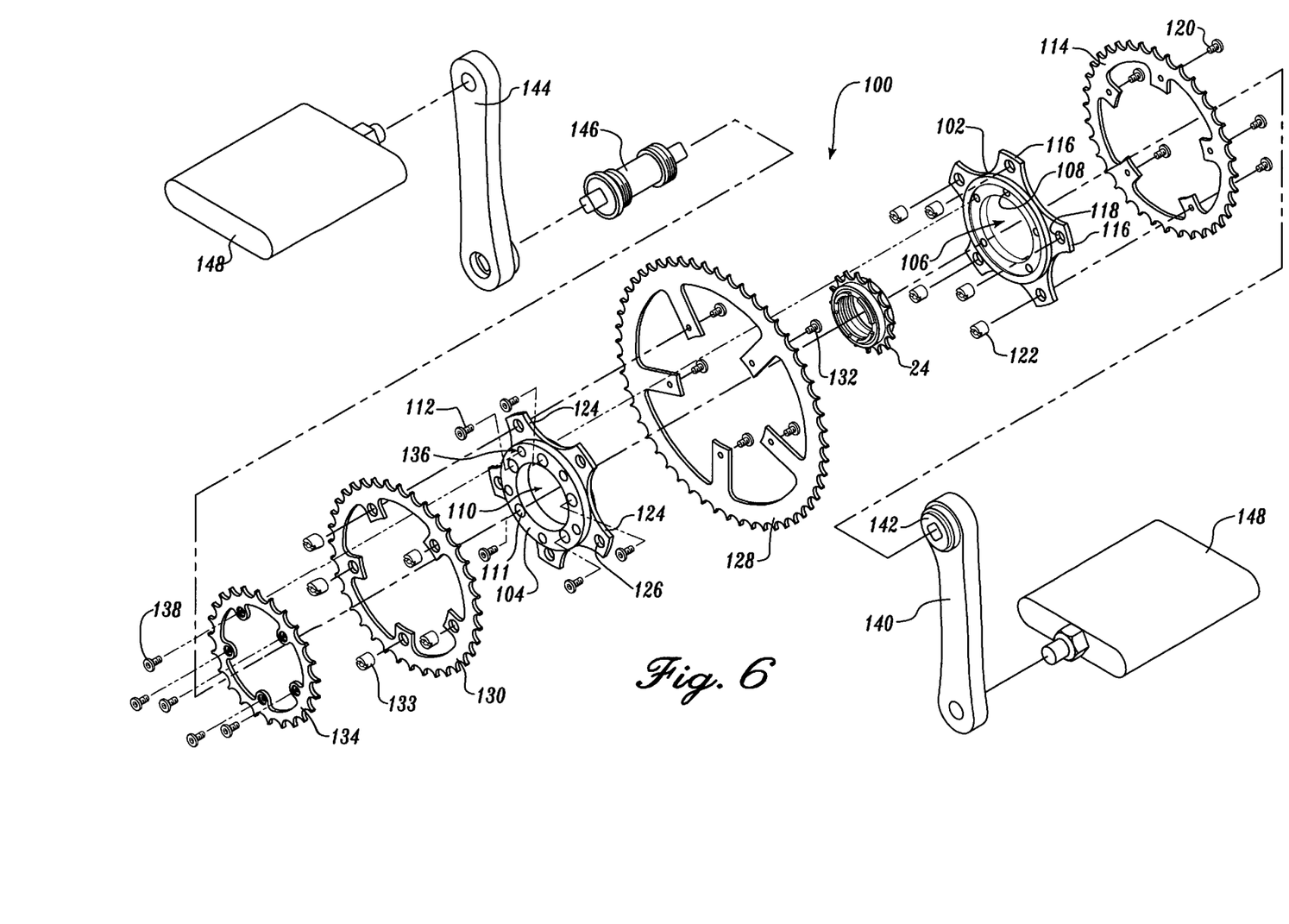
FIG. 6 is an exploded view of the stoker crank assembly of FIG. 5.

FIGS. 5 and 6 illustrate the construction of the stoker crank assembly 100 to allow independent pedaling by the stoker. Because it is advantageous to allow the gearing of the drive system to be changed while cycling, the stoker crank assembly preferably contains several chainrings that are attached to the freewheel assembly 24 using a first adapter plate 102 and a second adapter plate 104. The first adapter plate 102 is ring-shaped, with an inner hole 106 that is sized slightly larger than the diameter of the outer sleeve 28 of the freewheel assembly 24. The first adapter plate 102 has a plurality of threaded holes 108, preferably five, spaced at equidistant points around the circumference of the plate. The second adapter plate 104 is also ring-shaped, with an inner hole 110 that is sized slightly larger than the diameter of the outer sleeve 28 of the freewheel assembly 24. A plurality of holes 111, preferably five, are similarly spaced at equidistant points around the circumference of the second adapter plate 104. The freewheel assembly 24 is secured between the first and second adapter plates 102 and 104 by a plurality of hex bolts 112, in the same manner as the first and second adapter plates 36 and 38 are secured to the freewheel assembly in the captain crank assembly 20. The first and second adapter plates 102 and 104 in the stoker crank assembly 100 are therefore free to rotate around the inner sleeve 26 of the freewheel assembly 24.

A first chainring 114 of a desired size is fixed to the first adapter plate 102. The first adapter plate 102 has five arms 116 that are equally spaced around the exterior circumference of the adapter plate and extend radially from the body of the adapter plate. Each arm 116 is formed with a hole 118 that is located and sized so that the five holes in the arms of the adapter plate correspond with the location of mounting holes provided on a conventional chainring. A bolt 120 is placed through each hole 118 of the first adapter plate, through the corresponding mounting holes in the first chainring 114, and secured by a threaded insert 122, fixing the first chainring to the first adapter plate.

Unlike the second adapter plate 38 used in the captain crank assembly 20, the second adapter plate 104 used in the stoker crank assembly 100 is modified to allow additional chainrings to be fixed to the second adapter plate. The second adapter plate 104 has five arms 124 that are equally spaced around the exterior circumference of the adapter plate and extend radially from the body of the adapter plate. Each arm 124 is formed with a hole 126 that is located and sized so that the five holes in the arms correspond with the location of mounting holes provided on a conventional chainring. Each arm 124 is preferably also sized so that the thickness of the arm corresponds to the standard distance between chainrings in conventional crank assemblies. Sizing the arms in this manner allows a second chainring 128 and a third chainring 130 to be fixed to the second adapter plate. A bolt 132 is inserted through each mounting hole in the second chainring 128, through the corresponding mounting holes 126 in the second adapter plate 104, and through each mounting hole in the third chainring 130. The bolts are secured by threaded inserts 133, fixing the second and third chainrings to the second adapter plate 104.

The second adapter plate 104 is further modified to allow a fourth chainring 134 to be attached to the adapter plate. The body of the second adapter plate 104 is formed with five threaded holes 136 that are located between the mounting holes 111 that are used to attach the first adapter plate to the second adapter plate. The five threaded holes 136 are located and sized to correspond with the location of mounting holes provided on a conventional chainring. A mounting bolt 138 is inserted through each mounting hole in the fourth chainring 134 and into the corresponding threaded holes 136 in the second adapter plate 104, fixing the fourth chainring to the plate. The thickness of the second adapter plate 104 is selected so that the fourth chainring 134 is spaced from the third chainring 130 at a distance that corresponds to the distance between chainrings in conventional crank assemblies. The assembled first adapter plate, second adapter plate, and chainrings is depicted in FIG. 5.

A first crank arm 140 is secured to the freewheel assembly 24 by screwing a threaded plug 128 on the crank arm into the freewheel assembly 24. The first crank arm 140 and freewheel assembly and a second crank arm 144 are then attached to an axle protruding from either side of a conventional bottom bracket 146. Those skilled in the art will recognize that the bottom bracket 146 is mounted in the frame 12 of the bicycle. Pedals 148 are then fastened to the crank arms to complete the stoker crank assembly 100.

In a preferred embodiment of the independent pedaling system, the first chainring 114 of the stoker crank assembly 100 is coupled to the chainring 34 in the captain crank assembly 20 by chain 12. The second, third, and fourth chainrings of the stoker crank assembly 100 are selectively coupled using a derailleur system (depicted in FIG. 1) to the rear hub 18 of the tandem bicycle by chain 14.

Incorporating the freewheel assembly in the stoker crank assembly 100 allows the stoker to stop pedaling at any time during operation of the tandem bike. When the stoker stops pedaling and the captain continues pedaling in a forward direction, the captain continues to drive chain 12. The motion of chain 12 causes the outer sleeve 28 of the freewheel assembly 24 in the stoker crank assembly to rotate around the inner sleeve 26. The stoker's crank arms therefore remain stationary. At the same time, the rotation of the outer sleeve 28 of the freewheel assembly causes chain 14 to transfer the captain's pedaling force to the rear hub 18 of the tandem bicycle, driving the tandem bicycle forward. When the stoker resumes pedaling in a forward direction and brings the inner sleeve 26 of the freewheel assembly to the same rotary velocity as the outer sleeve 28 of the freewheel assembly, the unidirectional bearing is engaged and the pedaling force of the stoker is added to that of the captain. The stoker may therefore alternate between resting and forward pedaling as desired.

An advantage of the independent pedaling system described above is that the system may be implemented at a single rider position or at both the captain and stoker positions on a tandem bicycle. When the independent pedaling system is located at both rider positions, either rider has the option to stop pedaling while the other rider continues forward pedaling. When the independent pedaling system is located at only one rider position, the pedaler at that position has the option of forward pedaling or not pedaling while the pedaler at the other position is forward pedaling. The pedaler at the rider position that does not include the independent pedaling system must pedal at all times, however, when the rider with the independent pedaling system is forward pedaling.

Figure 7:
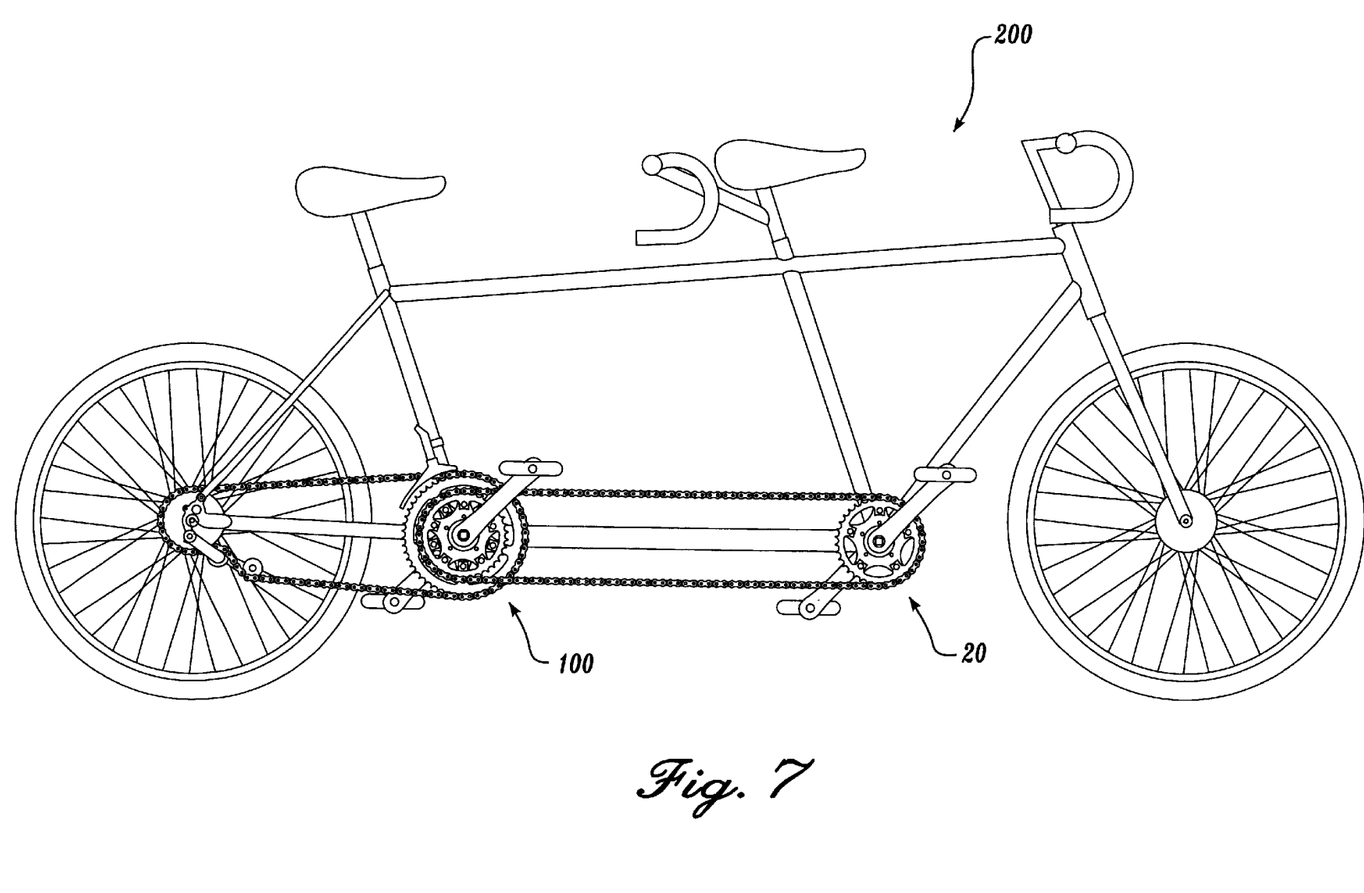
FIG. 7 is a side view of a conventional tandem bicycle that has been retrofitted to incorporate an independent pedaling system of the present invention.

An additional advantage of the independent pedaling system described above is that it may be easily retrofitted to a conventional tandem bike. FIG. 7 illustrates a conventional tandem bicycle 200 with the independent pedaling system implemented at the captain and stoker positions. Because the captain crank assembly 20 and stoker crank assembly 100 are attached to a conventional bottom bracket, either or both crank assemblies may be used to replace a conventional crank assembly. Since both chains are located on the same side of the bicycle frame, no modifications to a conventional tandem bicycle frame or derailleur system are required.

While the preferred embodiment of the invention has been illustrated and described, it will be appreciated that various changes can be made therein without departing from the spirit and scope of the invention. While a discrete freewheel assembly 24 is depicted in the preferred system, other constructions incorporating a unidirectional bearing may be envisioned. For example, a unidirectional bearing may be integrally constructed with the first or second adapter plates. Moreover, the unidirectional bearing may also be incorporated in the bottom bracket of the bicycle. While the preferred system therefore offers the simplest solution to retrofit a bicycle with an independent pedaling system, other more complex constructions incorporating a unidirectional bearing would accomplish the same purpose.

As will be appreciated by those skilled in the art, the unidirectional bearing could also be adapted to simulate the direct linkage provided in the drive system of a conventional tandem bicycle. Some cyclists prefer tandem pedaling where a captain and a stoker pedal "in-phase," i.e., with both the captain crank arms and the stoker crank arms located at the same place of a pedal stroke. To allow in-phase pedaling, the unidirectional bearing used in the independent pedaling system of the present invention may be constructed so that the inner sleeve engages the outer sleeve at only certain positions. For example, the inner sleeve may only engage the outer sleeve at two positions that are 180° apart. A rider that was freewheeling and then began to pedal would therefore find that the unidirectional bearing would only engage and begin to transfer the freewheeling pedaler's pedaling force to the bike when the crank arms of the freewheeling rider are in the same position (or 180° out of phase) with the crank arms of the other rider.

As will also be appreciated by those skilled in the art, the size of the chainrings incorporated in the captain crank assembly 20 or stoker crank assembly 100 may be selected to produce a desired gear ratio. For example, in a preferred embodiment of the stoker crank assembly, the first, second, third, and fourth chainrings have 38, 53, 44, and 28 teeth, respectively. In a preferred embodiment of the captain crank assembly 20, the chainring has 38 teeth. Riders desiring different gear ratios or different cadences between the stoker and the captain may easily select different sized chainrings for either crank assembly, as is well known in the art.

It can also be appreciated by one skilled in the art that while only a single chainring is depicted in the captain crank assembly 20, a greater number of chainrings may be incorporated in the assembly by varying the type of adapter plate that is attached to the freewheel assembly 24. Adding chainrings to the captain crank assembly requires, however, a further modification to the tandem bicycle to incorporate a derailleur system at the captain position. Similarly, while four chainrings are depicted in the stoker crank assembly 100, it will be appreciated that a greater or lesser number of chainrings may be incorporated in the assembly. Consequently, within the scope of the appended claims, it will be appreciated that the invention can be practiced otherwise that is specifically described herein.

The embodiments of the invention in which an exclusive property or privilege is claimed are defined as follows:

1. An independent pedaling tandem bicycle comprising:
   (a) a frame defining a captain position with a captain bottom bracket for a captain and a stoker position with a stoker bottom bracket for a stoker;
   (b) a front wheel;
   (c) a back wheel having a rear hub;
   (d) a stoker crank assembly attached to the stoker bottom bracket for pedaling by the stoker;
   (e) a first chain directly coupling the stoker crank assembly with the rear hub of the tandem bicycle;
   (f) a captain crank assembly attached to the captain bottom bracket for pedaling by the captain; and
   (g) a second chain directly coupling the captain crank assembly with the stoker crank assembly, wherein one of the stoker crank assembly or the captain crank assembly incorporates a freewheel assembly so that the other of the stoker crank assembly or the captain crank assembly may be continued to be pedaled in a forward direction by the stoker or the captain when the one of the stoker crank assembly or the captain crank assembly having the freewheel assembly is not pedaled in a forward direction by the stoker or the captain, wherein the stoker crank assembly comprises:
   (i) a first adapter plate;
   (ii) a second adapter plate coupled to the first adapter plate and securing the freewheel assembly therebetween;
   (iii) a first chainring coupled to the first adapter plate and receiving the second chain;
   (iv) a second chainring coupled to the second adapter plate and receiving the first chain; and
   (v) a crank arm coupled to the freewheel assembly so that rotation of the crank arm in the forward direction causes the freewheel assembly to engage and turn the first and second chainrings in the forward direction, and rotation of the crank arm in a backward direction causes the freewheel assembly to disengage and allow the first and second chainrings to rotate independently of the rotation of the crank arm.

2. An independent pedaling tandem bicycle comprising:
(a) a frame defining a captain position with a captain bottom bracket for a captain and a stoker position with a stoker bottom bracket for a stoker;
(b) a front wheel;
(c) a back wheel having a rear hub;
(d) a stoker crank assembly attached to the stoker bottom bracket for pedaling by the stoker;
(e) a first chain directly coupling the stoker crank assembly with the rear hub of the tandem bicycle;
(f) a captain crank assembly attached to the captain bottom bracket for pedaling by the captain; and
(g) a second chain directly coupling the captain crank assembly with the stoker crank assembly, wherein one of the stoker crank assembly or the captain crank assembly incorporates a freewheel assembly so that the other of the stoker crank assembly or the captain crank assembly may be continued to be pedaled in a forward direction by the stoker or the captain when the one of the stoker crank assembly or the captain crank assembly having the freewheel assembly is not pedaled in a forward direction by the stoker or the captain, wherein the captain crank assembly comprises:
 (i) a first adapter plate;
 (ii) a second adapter plate coupled to the first adapter plate and securing the freewheel assembly therebetween;
 (iii) a first chainring coupled to the first adapter plate and receiving the second chain; and
 (iv) a crank arm coupled to the freewheel assembly so that rotation of the crank arm in the forward direction causes the freewheel assembly to engage and turn the first chainring in the forward direction, and rotation of the crank arm in a backward direction causes the freewheel assembly to disengage and allow the first chainring to rotate independently of the rotation of the crank arm.

3. A tandem bicycle, comprising
(a) a frame having a captain pedaling station and a stoker pedaling station;
(b) a bottom bracket at one of the pedaling stations;
(c) a crank arm at the one of the pedaling stations; and
(d) a chainring assembly for attachment to the bottom bracket and to the crank arm, the chainring assembly comprising:
 (i) a unidirectional bearing adapted for coupling to the crank arm and the bottom bracket;
 (ii) a first adapter plate;
 (iii) a chainring mounted to said first adapter plate; and
 (iv) a second adapter plate coupled to the first adapter plate and securably holding the unidirectional bearing therebetween so that the attached chainring is rotated in a forward direction if the crank arm is turned in a forward direction, and the attached chainring freewheels if the crank arm is stopped or turned in a backward direction.

4. The chainring assembly of claim 3, further comprising a second chainring mounted to said second adapter plate.

5. The chainring assembly of claim 4, further comprising a plurality of chainrings mounted to said second adapter plate.

6. The chainring assembly of claim 3, wherein the unidirectional bearing is a freewheel assembly.

7. A bicycle comprising:
(a) a frame defining a position for a rider and provided with a pedal assembly, a front wheel, and a back wheel having a rear hub;
(b) a bottom bracket attached to the bicycle frame;
(c) a unidirectional bearing coupled to the bottom bracket, wherein the unidirectional bearing comprises a freewheel assembly comprising:
 (i) an annular outer sleeve carrying a plurality of radially projecting teeth and defining a plurality of notches between the plurality of teeth;
 (ii) an annular adapter plate; and
 (iii) means for fixing the teeth of the annular outer sleeve to the annular adapter plate;
(d) a chainring coupled to the freewheel assembly;
(e) a chain linking the chain ring with the rear hub of the bicycle; and
(f) a pair of crank arms coupled to the unidirectional bearing so that the rotation of the pair of crank arms in a forward direction causes a corresponding forward rotation of the chainring, and non-rotation or backward rotation of the pair of crank arms allows the chainring to freewheel.

8. The independent pedaling system of claim 7, wherein the means for fixing the annular outer sleeve to the annular adapter plate comprises a plurality of bolts disposed to pass through the plurality of notches of the outer sleeve and secured to the adapter plate.

9. The independent pedaling system of claim 7, wherein the freewheel assembly further comprises a second annular adapter plate secured to the first annular adapter plate, capturing the teeth of the annular outer sleeve therebetween.

10. The independent pedaling system of claim 9, wherein the means for fixing the annular outer sleeve comprises a plurality of bolts disposed to secure the second annular adapter plate to the first annular adapter plate, passing through the notches between the teeth of the outer sleeve therebetween.

11. The independent pedaling system of claim 9, further comprising a second chainring mounted to the second adapter plate.

12. The independent pedaling system of claim 11, further comprising a plurality of chain rings mounted to the second adapter plate.

13. The independent pedaling system of claim 7, wherein the chainring is coupled to the freewheel assembly by a plurality of bolts.

* * * * *

UNITED STATES PATENT AND TRADEMARK OFFICE
CERTIFICATE OF CORRECTION

PATENT NO. : 5,964,472
DATED : October 12, 1999
INVENTOR(S) : J.N. Smith et al.

It is certified that error appears in the above-identified patent and that said Letters Patent is hereby corrected as shown below:

COLUMN     LINE

[56]         Refs. cited      Insert the following reference:
Pg. 1, col. 1  (U.S. Pats.)   --5,810,379  9/1998  Shusterman--

Signed and Sealed this

Twentieth Day of June, 2000

Attest:

Q. TODD DICKINSON

Attesting Officer        Director of Patents and Trademarks